(12) United States Patent
Todhunter et al.

(10) Patent No.: US 8,666,730 B2
(45) Date of Patent: Mar. 4, 2014

(54) QUESTION-ANSWERING SYSTEM AND METHOD BASED ON SEMANTIC LABELING OF TEXT DOCUMENTS AND USER QUESTIONS

(75) Inventors: James Todhunter, Framingham, MA (US); Igor Sovpel, Minsk (BY); Dzianis Pastanohau, Minsk (BY)

(73) Assignee: Invention Machine Corporation, Boston, MA (US)

( * ) Notice: Subject to any disclaimer, the term of this patent is extended or adjusted under 35 U.S.C. 154(b) by 997 days.

(21) Appl. No.: 12/723,449

(22) Filed: Mar. 12, 2010

(65) Prior Publication Data
US 2010/0235164 A1   Sep. 16, 2010

Related U.S. Application Data

(60) Provisional application No. 61/159,959, filed on Mar. 13, 2009, provisional application No. 61/159,972, filed on Mar. 13, 2009.

(51) Int. Cl.
| G06F 17/20 | (2006.01) |
|---|---|
| G06F 17/28 | (2006.01) |
| G06F 17/27 | (2006.01) |
| G06F 17/21 | (2006.01) |
| G10L 15/00 | (2013.01) |
| G10L 13/00 | (2006.01) |
| G10L 13/08 | (2013.01) |
| G10L 21/00 | (2013.01) |

(52) U.S. Cl.
USPC .............. 704/9; 704/1; 704/2; 704/3; 704/4; 704/5; 704/6; 704/7; 704/8; 704/10; 704/257; 704/258; 704/260; 704/270; 704/270.1; 704/275

(58) Field of Classification Search
USPC ............ 704/1–10, 257, 258, 260, 270, 270.1, 704/275
See application file for complete search history.

(56) References Cited

U.S. PATENT DOCUMENTS

| 4,270,182 A | * | 5/1981 | Asija ................................. 704/8 |
| 4,829,423 A | | 5/1989 | Tennant et al. |

(Continued)

FOREIGN PATENT DOCUMENTS

| CN | 101702944 | 5/2010 |
| CN | 101702944 A | 5/2010 |
| EP | 1793318 | 6/2007 |
| EP | 1793318 A2 | 6/2007 |
| EP | 1941405 | 7/2008 |

(Continued)

OTHER PUBLICATIONS

Radev, D.R., et al., "Ranking Suspected Answers to Natural Language Question Using Predictive Annotation," Proceedings of the 6th Applied Natural Language Processing Conference, Apr. 29-May 4, 2000, pp. 150-157.

(Continued)

*Primary Examiner* — Edgar Guerra-Erazo
(74) *Attorney, Agent, or Firm* — Faegre Baker Daniels LLP

(57) ABSTRACT

A question-answering system for searching exact answers in text documents provided in the electronic or digital form to questions formulated by user in the natural language is based on automatic semantic labeling of text documents and user questions. The system performs semantic labeling with the help of markers in terms of basic knowledge types, their components and attributes, in terms of question types from the predefined classifier for target words, and in terms of components of possible answers. A matching procedure makes use of mentioned types of semantic labels to determine exact answers to questions and present them to the user in the form of fragments of sentences or a newly synthesized phrase in the natural language. Users can independently add new types of questions to the system classifier and develop required linguistic patterns for the system linguistic knowledge base.

28 Claims, 7 Drawing Sheets

(56) References Cited

U.S. PATENT DOCUMENTS

| | | | |
|---|---|---|---|
| 4,864,502 A | 9/1989 | Kucera et al. | |
| 4,868,750 A | 9/1989 | Kucera et al. | |
| 4,887,212 A | 12/1989 | Zamora et al. | |
| 5,060,155 A | 10/1991 | Van Zuijlen | |
| 5,146,405 A | 9/1992 | Church | |
| 5,331,556 A | 7/1994 | Black, Jr. et al. | |
| 5,369,575 A | 11/1994 | Lamberti et al. | |
| 5,377,103 A | 12/1994 | Lamberti et al. | |
| 5,384,894 A * | 1/1995 | Vassiliadis et al. | 706/52 |
| 5,404,295 A | 4/1995 | Katz et al. | |
| 5,418,889 A | 5/1995 | Ito | |
| 5,424,947 A | 6/1995 | Nagao et al. | |
| 5,485,372 A | 1/1996 | Golding et al. | |
| 5,519,608 A * | 5/1996 | Kupiec | 704/9 |
| 5,523,945 A * | 6/1996 | Satoh et al. | 704/9 |
| 5,559,940 A | 9/1996 | Hutson | |
| 5,614,899 A | 3/1997 | Tokuda et al. | |
| 5,638,543 A | 6/1997 | Pedersen et al. | |
| 5,694,592 A | 12/1997 | Driscoll | |
| 5,696,916 A | 12/1997 | Yamazaki et al. | |
| 5,708,825 A | 1/1998 | Sotomayor | |
| 5,715,468 A | 2/1998 | Budzinski | |
| 5,724,571 A | 3/1998 | Woods | |
| 5,748,973 A | 5/1998 | Palmer et al. | |
| 5,761,497 A | 6/1998 | Holt et al. | |
| 5,774,845 A | 6/1998 | Ando et al. | |
| 5,794,050 A | 8/1998 | Dahlgren et al. | |
| 5,799,268 A | 8/1998 | Boguraev | |
| 5,802,504 A | 9/1998 | Suda et al. | |
| 5,836,771 A * | 11/1998 | Ho et al. | 434/362 |
| 5,844,798 A | 12/1998 | Uramoto | |
| 5,873,056 A | 2/1999 | Liddy et al. | |
| 5,873,076 A | 2/1999 | Barr et al. | |
| 5,878,385 A | 3/1999 | Bralich et al. | |
| 5,924,108 A | 7/1999 | Fein et al. | |
| 5,933,822 A | 8/1999 | Braden-Harder et al. | |
| 5,963,940 A | 10/1999 | Liddy et al. | |
| 5,966,686 A | 10/1999 | Heidorn et al. | |
| 5,978,820 A | 11/1999 | Mase et al. | |
| 6,006,221 A | 12/1999 | Liddy et al. | |
| 6,026,388 A | 2/2000 | Liddy et al. | |
| 6,056,428 A | 5/2000 | Devoino et al. | |
| 6,076,051 A | 6/2000 | Messerly et al. | |
| 6,076,088 A | 6/2000 | Paik et al. | |
| 6,128,634 A | 10/2000 | Golovchinsky et al. | |
| 6,167,370 A | 12/2000 | Tsourikov et al. | |
| 6,185,592 B1 | 2/2001 | Boguraev et al. | |
| 6,202,043 B1 | 3/2001 | Devoino et al. | |
| 6,205,456 B1 | 3/2001 | Nakao | |
| 6,212,494 B1 | 4/2001 | Boguraev | |
| 6,246,977 B1 | 6/2001 | Messerly et al. | |
| 6,263,335 B1 | 7/2001 | Paik et al. | |
| 6,317,708 B1 | 11/2001 | Witbrock et al. | |
| 6,338,034 B1 | 1/2002 | Ishikawa | |
| 6,349,316 B2 | 2/2002 | Fein et al. | |
| 6,374,209 B1 | 4/2002 | Yoshimi et al. | |
| 6,381,598 B1 | 4/2002 | Williamowski et al. | |
| 6,401,086 B1 | 6/2002 | Bruckner | |
| 6,424,362 B1 | 7/2002 | Bornstein et al. | |
| 6,442,566 B1 | 8/2002 | Atman et al. | |
| 6,537,325 B1 | 3/2003 | Nishizawa | |
| 6,557,011 B1 | 4/2003 | Sevitsky et al. | |
| 6,584,464 B1 * | 6/2003 | Warthen | 1/1 |
| 6,665,666 B1 * | 12/2003 | Brown et al. | 1/1 |
| 6,701,345 B1 | 3/2004 | Carley et al. | |
| 6,754,654 B1 | 6/2004 | Kim et al. | |
| 6,789,230 B2 | 9/2004 | Katariya et al. | |
| 6,823,325 B1 | 11/2004 | Davies et al. | |
| 6,823,331 B1 | 11/2004 | Abu-Hakima | |
| 6,871,199 B1 | 3/2005 | Binnig et al. | |
| 7,035,877 B2 | 4/2006 | Markham et al. | |
| 7,058,626 B1 | 6/2006 | Pan et al. | |
| 7,092,928 B1 * | 8/2006 | Elad et al. | 706/60 |
| 7,120,574 B2 | 10/2006 | Troyanova et al. | |
| 7,146,358 B1 | 12/2006 | Gravano et al. | |
| 7,251,781 B2 | 7/2007 | Batchilo et al. | |
| 7,260,570 B2 | 8/2007 | Brown et al. | |
| 7,403,890 B2 * | 7/2008 | Roushar | 704/9 |
| 7,526,425 B2 * | 4/2009 | Marchisio et al. | 704/9 |
| 7,558,778 B2 * | 7/2009 | Carus et al. | 1/1 |
| 7,672,831 B2 | 3/2010 | Todhunter et al. | |
| 7,953,593 B2 * | 5/2011 | Marchisio et al. | 704/9 |
| 7,953,720 B1 * | 5/2011 | Rohde et al. | 707/706 |
| 7,958,104 B2 * | 6/2011 | O'Donnell | 707/706 |
| 7,970,766 B1 * | 6/2011 | Shamsi et al. | 707/737 |
| 2001/0014852 A1 | 8/2001 | Tsourikov et al. | |
| 2001/0021934 A1 | 9/2001 | Yokoi | |
| 2001/0049688 A1 | 12/2001 | Fratkina et al. | |
| 2002/0010574 A1 | 1/2002 | Tsourikov et al. | |
| 2002/0042707 A1 * | 4/2002 | Zhao et al. | 704/9 |
| 2002/0103793 A1 | 8/2002 | Koller et al. | |
| 2002/0116176 A1 | 8/2002 | Tsourikov et al. | |
| 2002/0129015 A1 * | 9/2002 | Caudill et al. | 707/6 |
| 2002/0169598 A1 | 11/2002 | Minker | |
| 2002/0184206 A1 | 12/2002 | Evans | |
| 2003/0004706 A1 * | 1/2003 | Yale et al. | 704/9 |
| 2003/0130837 A1 | 7/2003 | Batchilo et al. | |
| 2003/0191627 A1 * | 10/2003 | Au | 704/9 |
| 2003/0200079 A1 | 10/2003 | Sakai | |
| 2004/0001099 A1 | 1/2004 | Reynar et al. | |
| 2004/0006560 A1 | 1/2004 | Chan et al. | |
| 2004/0117352 A1 * | 6/2004 | Schabes et al. | 707/3 |
| 2004/0261021 A1 | 12/2004 | Mittal et al. | |
| 2005/0055385 A1 | 3/2005 | Sinha et al. | |
| 2005/0080614 A1 * | 4/2005 | Bennett | 704/9 |
| 2005/0086045 A1 * | 4/2005 | Murata | 704/2 |
| 2005/0114282 A1 | 5/2005 | Todhunter | |
| 2005/0114327 A1 * | 5/2005 | Kumamoto et al. | 707/3 |
| 2005/0131874 A1 | 6/2005 | Verbitsky | |
| 2005/0289168 A1 * | 12/2005 | Green et al. | 707/101 |
| 2006/0041424 A1 | 2/2006 | Todhunter | |
| 2006/0053000 A1 * | 3/2006 | Moldovan et al. | 704/9 |
| 2006/0167931 A1 | 7/2006 | Bobick et al. | |
| 2006/0224379 A1 * | 10/2006 | Ejerhed | 704/9 |
| 2006/0235689 A1 * | 10/2006 | Sugihara et al. | 704/257 |
| 2006/0242195 A1 | 10/2006 | Bove et al. | |
| 2007/0006177 A1 | 1/2007 | Aiber et al. | |
| 2007/0050393 A1 | 3/2007 | Vogel et al. | |
| 2007/0094006 A1 | 4/2007 | Todhunter et al. | |
| 2007/0136246 A1 * | 6/2007 | Stenchikova et al. | 707/3 |
| 2007/0156393 A1 | 7/2007 | Todhunter et al. | |
| 2008/0294637 A1 | 11/2008 | Liu | |
| 2008/0319735 A1 | 12/2008 | Kambhatla et al. | |
| 2009/0070103 A1 * | 3/2009 | Beggelman et al. | 704/9 |
| 2009/0192966 A1 * | 7/2009 | Horvitz et al. | 706/46 |
| 2009/0259642 A1 * | 10/2009 | Cao et al. | 707/4 |
| 2009/0287678 A1 * | 11/2009 | Brown et al. | 707/5 |
| 2009/0292265 A1 * | 11/2009 | Fan et al. | 707/5 |
| 2010/0100546 A1 * | 4/2010 | Kohler | 707/739 |
| 2010/0235341 A1 * | 9/2010 | Bennett | 707/706 |
| 2011/0184718 A1 * | 7/2011 | Chen | 704/2 |

FOREIGN PATENT DOCUMENTS

| | | |
|---|---|---|
| EP | 2135175 | 12/2009 |
| EP | 2135175 A1 | 12/2009 |
| JP | 4467184 B2 | 5/2010 |
| KR | 10-2008-0084803 | 9/2008 |
| KR | 10-2009-0130854 | 12/2009 |
| KR | 20090130854 A | 12/2009 |
| WO | 97/08604 | 3/1997 |
| WO | 0014651 A1 | 3/2000 |
| WO | 2007051106 | 5/2007 |
| WO | 2007051106 A2 | 5/2007 |
| WO | 2007051109 | 5/2007 |
| WO | 2008113065 | 9/2008 |
| WO | 2008113065 A1 | 9/2008 |
| WO | 2009016631 | 2/2009 |
| WO | 2009016631 A2 | 2/2009 |

OTHER PUBLICATIONS

Fattah, et al., "English/Arabic bilingual dictionary construction using parallel texts from the internet archive", Circuits and Systems, IEEE, Dec. 2003.

(56) References Cited

OTHER PUBLICATIONS

Fujii, et al., "Japanese/English cross-language information retrieval: exploration of query translation and transliteration", Computers and the Humanities, pp. 389-420, 2001.

Pirkola, et al., "Dictionary-based cross-language information retrieval: problems, methods, and research findings", Information retrieval, pp. 209-230, 2001.

Ballesteros, et al., "Phrasal translation and query expansion techniques for cross-language information retrieval", SIGIR 1997.

International Search Report dated Jul. 30, 2008 issued in corresponding International Application No. PCT/US2008/057183.

International Search Report dated Apr. 17, 2007 issued in corresponding International Application No. PCT/US2006/060198.

Extended European Search Report dated Jul. 20, 2012, issued in corresponding European Application No. 10751510.

Davidov, et al., "Classification of Semantic Relationships between Nominals Using Pattern Clusters." In:Proc. of ACL-08:HTL. Columbus, Ohio, USA, p. 227-235. Jun. 30, 2008.

International Search Report dated Sep. 29, 2010 issued in corresponding International Application No. PCT/US2010/027218.

International Search Report dated Oct. 13, 2010 issued in corresponding International Application No. PCT/US2010/027221.

Kupiec, Julian, et al., "A Trainable Document Summarizer," ACM Press Proceeding of the 18th Annual International ACM SIGIR Conference on Research and Development in Information Retrieval, pp. 68-73, 1995.

Goldstein, et al., "Summarizing Text Documents: Sentence Selection and Evaluation Metrics," Proceedings of the 22nd annual international ACM SIGIR conference on Research and development in information retrieval, 1999, pp. 121-128.

Khoo, Christopher S. G., et al., "Extracting Causal Knowledge from a Medical Database Using Graphical Patterns", XP-002427019, Centre for Advanced Information Systems, School of Computer Engineering, Nanyang Technological University, Singapore, 2000, pp. 336-343.

Girju, Roxana, "Automatic Detection of Causal Relations for Question Answering", XP-002427020, Computer Science Dept., Baylor University, 2003, pp. 76-83.

Khoo, Christopher S.G., et al., "Automatic Extraction of Cause-Effect Information from Newspaper Text Without Knowledge-Based Inferencing", XP-00247013, Literacy and Linguistic Computing, vol. 13, No. 4, 1998, pp. 177-186.

Chan, Ki, et al., "Extracting Causation Knowledge from Natural Language Texts", XP-002427021, Department of Systems Engineering and Engineering Management, The Chinese University of Hong Kong, May 2002, pp. 555-560.

Chang, Du-Seong, et al., "Causal Relation Extraction Using Cue Phrase and Lexical Pair Probabilities", XP-002427022, Department of Electrical Engineering & Computer Science, Korea Advanced Institute of Science and Technology, Jan. 25, 2005, pp. 61-70.

Paice, C., et al., "The Use of Causal Expressions for Abstracting and Question Answering", XP-002427857, 2005, pp. 1-7.

Amaral, Carlos, et al., "Design and Implementation of a Semantic Search Engine for Portuguese", XP-002427855, 4th International Conference on Language Resources and Evaluation, Lisbon, Portugal, 2004, pp. 1-4.

Neumann, Gunter, et al., "A Cross-Language Question/Answering System for German and English", XP-002427856, LT-Lab, DFKI, Saarbrucken, Germany, 2004.

Abney, S., et al., "Answer Extraction", Proceedings of the 6th Applied Natural Language Processing Conference, Apr. 29-May 4, 2000, pp. 296-301.

Amaral, Carlos, et al., "Design and Implementation of a Semantic Search Engine for Portuguese", May 26-28, 2004, Portugal, Proceedings of the 4th International Conference on Language Resources and Evaluation, XP002427855.

Ball, G. et al., "Lifelike Computer Characters: The Persona Project at Microsoft Research," Software Agents, AAAI Press/The MIT Press, 1997, Chapter 10, pp. 191-222.

Cardie, C., et al., "Examining the Role of Statistical and Linguistic Knowledge Sources in a General-Knowledge Question-Answering System", Proceedings of the 6th Applied Natural Language Processing Conference, Apr. 29-May 4, 2000, pp. 180-187.

Chan, Ki, et al. "Extracting Causation Knowledge from Natural Language Texts", May 2002, Springer-Verlag, Proceedings of the 6th Pacific-Asia Conference on Advances in Knowledge Discoery and Data Mining, Lecture Notes in Computer Science 2336, XP002427021, pp. 555-560.

Chang, Du-Seong, et al., "Casual Relation Extraction Using Cue Phrase and Lexical Pair Probabilities", Jan. 25, 2005, Springer Berlin/Heidelberg, Lecture Notes in Computer Science 3248, XP002427022, pp. 61-70.

Extended European Search Report dated Apr. 1, 2011, issued in corresponding European Application No. 08732326.7.

Extended European Search Report dated Jul. 18, 2012, issued in corresponding European Application No. 10751508.

Extended European Search Report dated Jul. 20, 2012, issued in correseponding European Application No. 10751510.

International Search Report dated Oct. 13, 2010, issued in corresponding International Application No. PCT/US2010/027221.

International Search Report dated Sep. 29, 2010, issued in corresponding International Application No. PCT/US2010/027218.

The International Search Report issued in corresponding PCT Application No. PCT/US2006/060191 dated Nov. 4, 2007.

Davidov et al., "Classification of Semantic Relationships between Nominals Using Pattern Clusters," In. Proc. of ACL-08-HTL, Columbus, Ohio, USA, pp. 227-235, Jun. 30, 2008.

Engelson, et al., "A Memory-Based Approach to Learning Shallow Natural Language Patterns", Bar-Ilan University, Israel, May 23, 1999, p. 1-28.

Feng, L., et al., "Beyond information searching and browsing: acquiring knowledge from digital libraries", Information Processing and Management, 41 (2005), pp. 97-120.

Girju, et al., "Automatic Discovery of Part-Whole Relations," Association for Computational Linguistics, Mar. 2006, pp. 83-135, vol. 32, No. 1, MIT Press, Cambridge, MA, USA.

Girju, Roxana, "Automatic Detection of Casual Relations for Questioning Answering", 2003, Association for Computational Linguistics, Proceedings of the ACL 2003 Workshop on Multilingual Summarization and Question Answering, XP002427020, pp. 77-80.

Goldstein et al., "Summarizing Text Documents: Sentence Selection and Evaluation Metrics," Proceedings of the 22nd annual international ACM SIGIR conference on Research and development in information retrieval, 1999, pp. 121-128.

International Search Report dated Jul. 30, 2008, issued in corresponding International Application No. PCT/US2008/057183.

International Search Report dated Nov. 17, 1999, issued in corresponding International Application No. PCT/US1999/19699.

Khoo, Christopher S.G., et al., "Automatic Extraction of Cause-effect Information from Newspaper Text Without Knowledge-Based Inferencing", XP-002427013, Literary and Linguistic Computing, vol. 13, No. 4, 1998, pp. 177-186.

Khoo, Christopher S.G., et al., "Extracting Casual Knowledge from a Medical Database Using Graphical Patterns", 2000, Association for Computational Linguistics, Proceedings of the 38th Annual Meeting on Association for Computational Linguistics, Hong Kong, XP002427019, pp. 336-343.

Kupiec, Julian et al., "A Trainable Document Summarizer," ACM Press Proceeding of the 18th Annual International ACM SIGIR Conference on Research and Development in Information Retrieval, pp. 68-73, 1995.

Neuman, Gunter, et al., "A Cross-Language Question/Answering-System for German and English", Aug. 21-22, 2003, Norway, Cross Language Evaluation Forum, Proceedings following the 7th European Conference on Digital Libraries (ECDL 2003), XP002427856.

Paice, Christopher, et al., "The Use of Casual Expressions for Abstracting and Question Answering", Sep. 21-23, 2005, Bulgaria, Proceedings of the International Conference RANLP 2005 (Recent Advances in Natural Language Processing), XP002427857.

(56) References Cited

OTHER PUBLICATIONS

Radev, D.R., et al., "Ranking Suspected Answers to Natural Language Question Using Predictive Annotation", Proceedings of the 6th Applied Natural Language Processing Conference, Apr. 29-May 4, 2000, pp. 150-157.

Reicken, D., "The M System". Software Agents, AAAI Press/The MIT Press, 1997, Chapter 12, pp. 257-260.

Srihari, R., et al., "A Question Answering System Supported by Information Extraction", Proceedings of the 6th Applied Natural Language Processing Conference, Apr. 29-May 4, 2000, pp. 166-172.

Tapanainen, P. et al., "A non-projective dependency parser," Fifth Conference on Applied Natural Language Processing, Mar. 31, 1997-Apr. 3, 1997, Association for Computational Linguistics, pp. 64-71.

Volk, Martin, et al., "Semantic Annotation for Concept-Based Cross-Language Medical Information Retrieval", International Journal of Medical Informatics 67 (2002), pp. 97-112.

* cited by examiner

The maximum value of x is on the ionic radius of the lanthanide element.

| Subject | maximum value of x |
|---|---|
| Action | be |
| Object | |
| Preposition | on |
| Indirect Object | ionic radius of the lanthanide element |
| Adjective | dependent |
| Adverbial | |

FIG. 4A

The register contains the proper bit pattern to begin its shift-out operation.

| Cause | |
|---|---|
| Subject1 | register |
| Action1 | contain |
| Object1 | proper bit pattern |
| Preposition1 | |
| Indirect Object1 | |
| Adjective1 | |
| Adverbial1 | |
| Effect | |
| Subject2 | |
| Action2 | begin |
| Object2 | shift-out operation |
| Preposition2 | |
| Indirect Object2 | |
| Adjective2 | |
| Adverbial2 | |

FIG. 4B

INPUT: What are the disadvantages of oxygen?

- result of the linguistic analysis of the question:

| Subject | disadvantage of oxygen |
|---------|------------------------|
| Action  | be                     |
| Qword   | What                   |

- formal representation of the linguistic pattern:

| Subject | disadvantage of SMTH | QT_Disadvantage | SMTH_NG |
|---------|----------------------|-----------------|---------|
| Action  | BE                   |                 |         |
| Qword   | What                 |                 |         |

- formal representation of the question:

1 oxygen NGMain QT_Disadvantage

FIG. 5A

Who killed John Lennon?

- result of the linguistic analysis of the question:

| Action | kill |
|---|---|
| Object | John Lennon |
| Qword | Who |

- formal representation of the linguistic pattern:

| Subject | Empty | | |
|---|---|---|---|
| Action | Exist | QT_SubjectPerson | REPH |
| Object | Exist | | |
| Qword | Who | | |

- formal representation of the question:

ı kill Act QT_SubjectPerson     ı killer NGMain QT_SubjectPerson
ı John ObjAttr     ı John NGAttr
ı Lennon ObjMain     ı Lennon NGAttr ı killing NGMain QT_SubjectPerson
                         ı John NGAttr
                         ı Lennon NGAttr

FIG. 5B

QUESTION-ANSWERING SYSTEM AND METHOD BASED ON SEMANTIC LABELING OF TEXT DOCUMENTS AND USER QUESTIONS

RELATED APPLICATIONS

The present application claims priority to U.S. Provisional Patent Application Ser. No. 61/159,959, filed Mar. 13, 2009, entitled "Question-Answering System And Method Based On Semantic Labeling Of Text Documents And User Questions" and to U.S. Provisional Patent Application Ser. No. 61/159,972, filed Mar. 13, 2009, entitled "System And Method For Automatic Semantic Labeling Of Natural Language Texts," each of which is incorporated herein by reference in its entirety.

The present application, while not claiming priority to, may also be related to U.S. Pat. No. 7,251,781, entitled "Computer Based Summarization of Natural Language Documents", issued Jul. 31, 2007 to Batchilo et al., U.S. Pat. No. 7,672,831, entitled "System And Method for Cross-Language Knowledge Searching," issued Mar. 2, 2010 to Todhunter et al., and co-pending U.S. patent application Ser. No. 09/991,079 filed Nov. 16, 2001, entitled "Semantic Answering System and Method" (published as U.S. Patent Pub. No. 20020116176), each of which is incorporated herein by reference in its entirety.

FIELD

This application relates to computer based question-answering systems that perform searches for exacting answers in text document databases to questions formulated by users in a natural language.

DESCRIPTION OF RELATED ART

The following U.S. Patent documents provide descriptions of art related to the present application: U.S. Pat. No. 5,794,050, issued August 1998 to Dahlgren et al.; U.S. Pat. No. 5,933,822, issued August 1999 to Braden-Harder et al.; U.S. Pat. No. 5,966,686, issued October 1999 to Heidorn et al.; U.S. Pat. No. 6,246,977, issued June 2001 to Messerly et al.; U.S. Pat. No. 6,263,335, issued July 2001 to Paik et al.

Within the field of computer-based information retrieval systems, there exists certain types of question-answering (Q-A) systems that are regarded as information systems for the extraction of answers to different types of questions formulated by a user in natural language (NL). Answers are extracted from various sources (e.g., text documents, encyclopedias, databases etc.).

Given such queries, a conventional system tries to present them in a formal way, e.g., by means of special analysis. Such attempts are referred to as NL understanding systems. The first forms of presentation were sequences of keywords, Boolean expressions composed of keywords, particular units, etc. In this case, the search of the answers boiled down to the search of sentences in the text or their fragments, including, ideally, all of the keywords from the question in one of a few predetermined forms. For example, it was assumed that the answers to the question "What is the color of octopus blood?" could be extracted from the results of the keyword search for "color", "blood" and "octopus", for example, with the help of patterns "the color of octopus blood is . . . ", "blood of octopus has . . . color", etc. However, this approach did not take into consideration that the answer to such a question may be presented in the sentence "The octopus blood is blue.," which could potentially be the only answer present across all of the available sources. However, in a conventional system, an answer to the original query would not be obtained from this sentence due to the absence of the keyword "color" in the sentence.

In general, conventional keyword searching becomes very inefficient in the case of large volumes of information and unrestricted NL user queries. For instance, in the prior example, exclusion of the word "color" could lead to an unmanageably large volume of returned answers, while inclusion of the word "color" could cause extremely useful answers to be omitted.

Given the shortcomings of such systems, further investigations have been performed. Computer technologies have been advanced. They have dealt with preprocessing available information and analyzing a user request/text document with linguistic means, including part-of-speech tagging, parsing, and semantic analysis, which provides a more accurate formal representation of user request/text document. Below is an overview of patents that touch upon such systems.

U.S. Pat. No. 5,794,050 to Dahlgren et al. describes using a NL understanding module, including naïve semantic lexicon and noun and verb phrase recognition, which receives a NL input and generates a first order logic (FOL) output.

U.S. Pat. No. 5,933,822 to Braden-Harder et al. and U.S. Pat. No. 5,966,686 to Heidorn et al. describe translating a user request into a logical form graph (LFG), which is a set of logical form triples. The patents purport to determine semantic relations between important words in a phrase (i.e., deep subject, deep object, etc.), but, in fact, these LGF approaches actually determine semantic relations between only grammatical subject, object, etc, and not deep subject, deep object, and so on.

With regard to these approaches, it should be noted, that usually it becomes increasingly difficult to add new semantic rules to a NL processing system. Adding a new rule involves new procedural logic, which may conflict with that already programmed in the semantic subsystem. The size and the complexity of a LFG and FOL make the use of them quite difficult, and even inefficient for solving many tasks. Nevertheless, it became evident that advanced linguistic analysis of a user request/text document combined with the algorithms, i.e., that model the behavior of a person and that search for answers to the query in the text documents, is a promising means for building effective Q-A systems.

With regard to the depth of the linguistic analysis, the developed systems of such type generally deal with only the binary relations between the concepts.

In this way, U.S. Pat. No. 6,246,977 to Messerly et al. describes performing semantic analysis of text in the form of logical form "deep subject—verb—deep object," however, the mentioned logical form is purely a grammatical notion: "deep subject" and "deep object" are only a "noun" and "verb" is only a "principle verb". Therefore, the determination and analysis of deep subject, deep object, etc. are not truly expressed in this patent.

U.S. Pat. No. 6,263,355 to Paik et al. describes an information extraction system that is domain-independent and automatically builds its own subject knowledge base. The basis of this knowledge base is composed of concept-relation-concept triples (CRCs), where the first concept is usually a proper name. This is an example of a quite simplistic and rigidly defined deep semantic analysis of text which relies on recognition of dyadic relations that link pairs of concepts and monadic relations that are associated with a single concept. The system extracts semantic relations from the previously part-of-speech tagged and syntactically parsed text by looking for specialized types of concepts and linguistic clues, including some prepositions, punctuation, or specialized phrases.

Of course, the procedure of semantic analysis is restricted in this case by the framework of CRC relations. For example, recognition of cause-effect relations can be performed only for objects occurring together with a certain type of verb. Although such recognition often requires a wider context, and it turns out that in the general case it should be based on a set of automatically recognized semantic components in texts, the so-called "facts." For example, one of the components of such facts is a semantic notion of an "action," in contrast to merely a "verb". Taking into account the restriction inherent in the imposed framework of CRC relations, semantic labeling in this case requires the development of a large number of patterns which is very labor-consuming. Finally, such semantic labeling actually deals only with topical content of the text and does not take into account its logical content. Thus, Q-A systems based on such linguistic analysis are only able to answer the so-called factoid type questions. In total, this presents a serious limitation for the deployment of similar systems in the real world practice of personal users.

SUMMARY

In accordance with aspects of the present invention, provide are a Question-Answering system and method for automatic extraction from the text documents of answers to the questions of different character related to Topical Content as well as Logical Content posed by the user in a natural language. It is based on a Semantic Processor that performs preformatting of text documents, basic linguistic analysis of text documents/user queries (e.g., lexical, part-of-speech, syntactic, and semantic analysis), as well as their semantic labeling using terms (e.g., markers) of basic knowledge types (e.g., objects/classes of objects, facts and the rules reflecting regularities of the outside world/knowledge domain in the form of cause-effect relations), their components and attributes. Simultaneously, the system and method can perform semantic labeling with terms of question types (thus, it models human behavior) for so-called target words using predefined Classifier of question types and components of possible answers (for text documents).

A matching procedure makes use of the mentioned types of semantic labels allows finding exact answers to a given question and presents them to the user in the form of a sentence, its fragment, or a newly synthesized phrase in natural language. In comparison with the traditional information retrieval systems the emphasis of the present matching procedure is shifted to the target semantic labeling of text documents. At that, the depth of said semantic analysis of text documents/user queries allows precisely define a semantic context of the answer, and provides effective technology for development of linguistic patterns necessary for semantic labeling of text documents/user queries. Analyzing his/her information necessity and linguistic means of its expression in text documents, a user can independently add new types of questions to the System Classifier and, according to the specified technology, develop required linguistic patterns.

In accordance with one aspect of the invention, provided is a method for question-answering based on automatic semantic labeling of text documents and user questions, which includes providing at least one computer processor coupled to at least one non-transitory storage medium, the at least one computer processor performing the method. The method also includes: electronically receiving natural language text documents; electronically receiving a user question formulated in a natural language; performing a basic linguistic analysis of the text documents and the user question; performing semantic labeling of the text documents through semantic analysis, and storing the semantically labeled text documents in a labeled text documents database; performing semantic labeling of the user question through semantic analysis; searching the labeled text documents database for text fragments relevant to the semantically labeled user question, wherein relevance is based on a ranking of the text fragments relative to the semantically labeled user question; and synthesizing answers to the user question from the relevant text fragments, and electronically presenting the synthesized answer to the user.

The method can further include: applying parts-of-speech tags to the text documents and user question to generate tagged text documents and user question; parsing the tagged text documents and user question to generate parsed and tagged text documents and user question; and semantically analyzing the parsed and tagged text documents and user question to generate semantically analyzed, parsed, and tagged text documents and user question.

Applying parts-of-speech tags can be performed on preformatted text documents that include text with non-natural language symbols removed.

The semantic analysis can include: recognizing one or more facts in the form of one or more expanded Subject-Action-Object (eSAO) sets in the text documents and user question, wherein each eSAO set has one or more eSAO components; and recognizing rules in the text documents and user question that reflect regularities of the outside world/knowledge domain in the form of Cause-Effect relations in the eSAO sets, wherein each of the Cause-Effect relations comprises a Cause eSAO and an Effect eSAO.

The one or more eSAO components can include one or more elements of a group consisting of: subjects, objects, actions, adjectives, prepositions, indirect objects and adverbs.

The Cause eSAO can include one or more eSAO components of the one or more eSAO sets and the Effect eSAO can include one or more other eSAO components of the one or more eSAO sets.

The Cause-Effect relations can include a sequential operator relating the eSAO components of the Cause eSAO to the other eSAO components of the Effect eSAO with lexical, grammatical, and/or semantic language means.

Recognizing one or more expanded Subject-Action-Object (eSAO) sets in the text documents and user question can include recognizing one or more subjects, objects, actions, adjectives, prepositions, indirect objects, and adverbs in one or more sentences of the text documents and user question.

Recognizing one or more expanded Subject-Action-Object (eSAO) sets and Cause-Effect relations in the text documents and user question can include accessing a linguistic knowledge base having a database of patterns defining eSAO and Cause-Effect components.

Semantic labeling of the semantically analyzed text documents can be based on matching the semantically analyzed text documents against question classification based linguistic patterns in a patterns database that is a part of a linguistic knowledge base. That method can include: determining part-of-speech tags, syntactic tags, and semantic labels and eSAO sets and Cause-Effect sets for text in the text documents; generating eSAO labels and Cause-Effect labels; and matching the eSAO labels and Cause-Effect labels to semantic labels of question types and answer components for target words.

Semantic labeling of the semantically analyzed user question can be based on matching the semantically analyzed user question against question classification based linguistic patterns in a patterns database that is a part of a linguistic knowledge base. That method can include: determining part of-speech tags, syntactic tags, and semantic labels of words in the user question and determining eSAO sets and cause-effect sets from the words of the user question; generating eSAO labels and cause-effect labels from the eSAO sets and cause-effect sets; and matching the eSAO labels and cause-effect labels to semantic labels of question types for target words.

Searching the labeled text documents database for the text fragments relevant to semantically labeled user questions can be based on matching the semantically labeled user questions against sentences from the labeled text documents database. This can include: matching words and semantic labels; and building a list of sentences relevant to the user question with indication of a degree of relevance.

The method can optionally include ranking sentences from the labeled text documents database relevant to the user question based on a degree of relevance of each sentence to a user question, determined according to predetermined criteria for matching semantic information from each sentence with semantic information from the user question.

Synthesizing the answers can include synthesizing natural language answers to a user question from relevant sentences is performed in the form of those original fragments of relevant sentences which were marked with labels of answer components on the stage of semantic labeling of text documents, and in the form of new natural language phrases, generated on the basis of linguistic patterns from the linguistic knowledge base, based on the eSAO format.

In accordance with another aspect of the present invention, provided is a computer program product that includes a computer-readable medium having stored therein computer-executable instructions for performing a method for question-answering based on automatic semantic labeling of text documents and user questions. The method includes: electronically receiving natural language text documents; electronically receiving a user question formulated in a natural language; performing a basic linguistic analysis of the text documents and the user question; performing semantic labeling of the text documents through semantic analysis, and storing the semantically labeled text documents in a labeled text documents database; performing semantic labeling of the user question through semantic analysis; searching the labeled text documents database for text fragments relevant to the semantically labeled user question, wherein relevance is based on a ranking of the text fragments relative to the semantically labeled user question; and synthesizing answers to the user question from the relevant text fragments.

The method can further include electronically presenting to the user the answers to his or her questions.

In accordance with yet another aspect of the invention, provided is a question-answering system that uses automatic semantic labeling of text documents and a user question in electronic or digital form formulated in natural language. The system includes a linguistic knowledge base and a linguistic analyzer that produce linguistically analyzed text documents and user question. The linguistic analyzer has a semantic analyzer that includes an expanded Subject-Action-Object (eSAO) recognizer and a Cause-Effect recognizer that produce semantically analyzed text documents and user question, including recognizing one or more facts in the form of one or more eSAO sets based on the text documents and user question. Here, eSAO and Cause-Effect recognition is based on patterns stored in the linguistic knowledge base.

The linguistic analyzer can further include: a part-of-speech tagger that receives preformatted text documents based on the text documents in electronic or digital format and the user question; and a parser that receives the text documents and user question tagged by the part-of-speech tagger and provides parsed text documents and user question to the semantic analyzer. The part-of-speech tagger and the parser can operate with data stored in the linguistic knowledge base.

The question-answering system can further include: a preformatter that receives the text documents in electronic or digital format and produces the preformatted text documents; a text documents labeler that matches the semantically analyzed text documents against question classification based linguistic patterns stored in the linguistic knowledge base and generates semantic relationship labels based on the semantically analyzed text documents and the matching, whereby the semantically labeled text documents are stored in labeled text documents database; a question labeler that matches the semantically analyzed user question against question classification based linguistic patterns stored in the linguistic knowledge base and generates semantic relationship labels based on the semantically analyzed user questions and the matching; a searcher that matches the semantically labeled user question against sentences from labeled text documents database, wherein the searcher matches words and semantic labels, and builds a list of sentences relevant to the user question with an indication of a degree of relevance; an answer ranker that sorts sentences from the labeled text documents database that are relevant to the user question, the sorting in accordance with the degree of relevance of each sentence to the user question; and a text synthesizer that generates the natural language answers to the user question from the relevant sentences and electronically presents them to the user.

The preformatter can be configured to perform at least one of the following functions: removal of any symbols in a digital or electronic presentation of the text documents that do not form part of natural language text; detection and correction of any mismatches or mistakes in text documents; and partitioning the text into structures of sentences and words.

The text documents labeler can be configured to match the semantically analyzed text documents against linguistic patterns by matching words, part-of-speech tags, syntactic tags, eSAO and Cause-Effect sets.

The text documents labeler can be configured to generate semantic relationship labels by generating eSAO and Cause-Effect labels and based on matching semantic labels of question types and answer components for target words.

The question labeler can be configured to match the semantically analyzed user questions against linguistic patterns by matching words, part-of-speech tags, syntactic tags, labels of question words, eSAO and Cause-Effect sets.

The question labeler can be configured to generate the semantic relationship labels by generating eSAO and Cause-Effect labels and based on matching semantic labels of question types for target words.

The text synthesizer can be configured to generate natural language answers to the user questions by generating answers in the form of original fragments of relevant sentences, and in the form of new natural language phrases, generated on the basis of linguistic patterns from the linguistic knowledge base based on eSAO format.

The semantic analyzer can also be configured to generate Cause-Effect relations from the eSAO sets, wherein each of the Cause-Effect relations comprises a Cause eSAO, an Effect eSAO, and at least one sequential operator relating the Cause eSAO to the Effect eSAO.

Each of the eSAO sets can include eSAO components, where the Cause eSAO includes one or more of the eSAO components and the Effect eSAO includes one or more of the eSAO components different than the one or more eSAO components of the Cause eSAO.

The one or more eSAO components can include one or more elements of a group consisting of: subjects, objects, actions, adjectives, prepositions, indirect objects and adverbs.

BRIEF DESCRIPTION OF THE DRAWINGS

The drawing figures depict preferred embodiments by way of example, not by way of limitation. In the figures, like reference numerals refer to the same or similar elements. The drawings are not necessarily to scale, emphasis instead being placed upon illustrating aspects of the invention.

FIG. 4A shows an embodiment of an output of an eSAO Recognizer for a concrete or particular sentence, according to the aspects of the present invention.

FIG. 4B illustrates an embodiment of an example of an output of a C-E Recognizer for another concrete or particular sentence, according to the aspects of the present invention.

FIG. 5A and FIG. 5B illustrate examples of two concrete or particular questions, results of their linguistic analysis, and their formal representations, obtained on the basis of described linguistic patterns, according to the aspects of the present invention.

DETAILED DESCRIPTION

Figure 1:
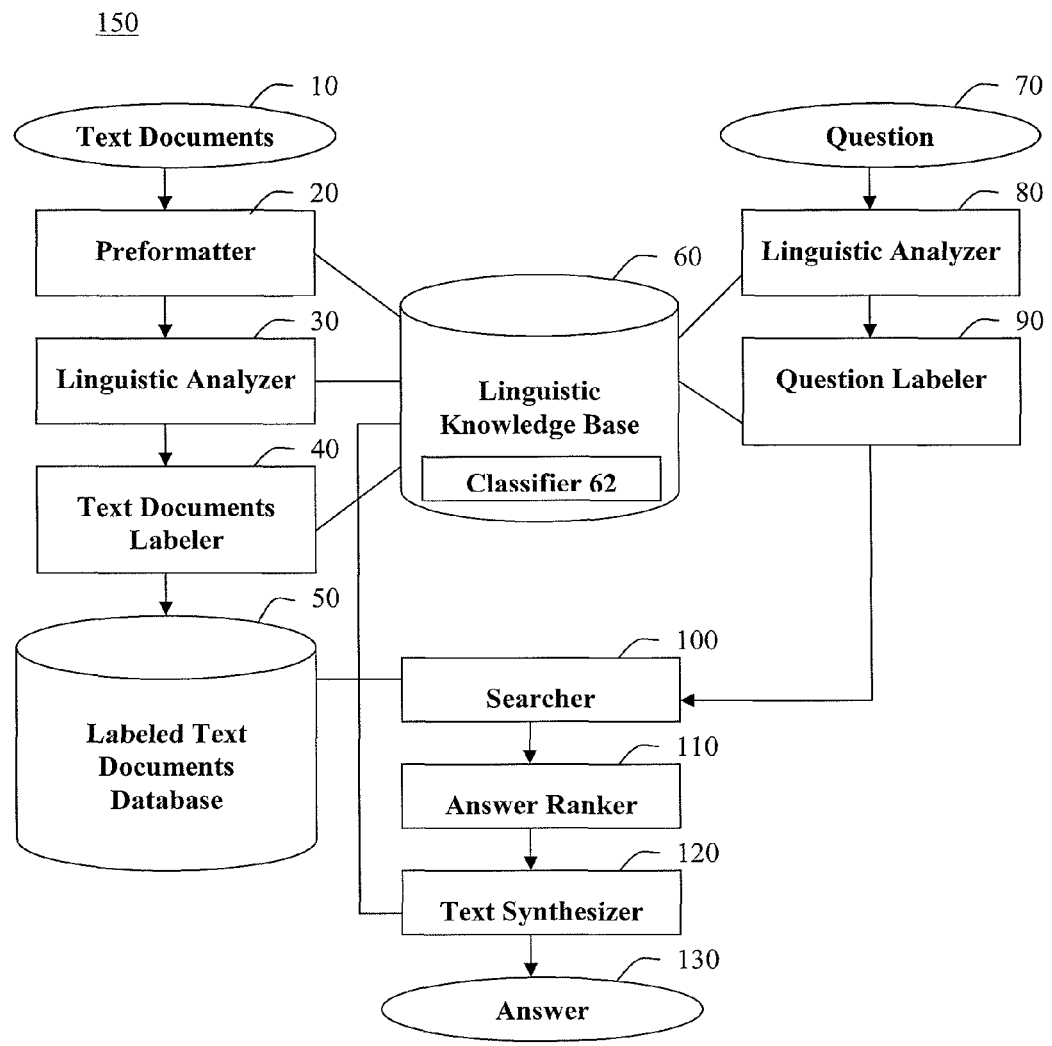
FIG. 1 is a high-level architecture diagram of an embodiment of a set of functional modules or processors, which can be implemented in one or more computers, to form a Question-Answering System, according to the aspects of the present invention.

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Embodiments of the present invention relate to a Question-Answering system that performs the search of a user query formulated in some natural language (NL) in a text database and that retrieves not only fragments of the document (for example, a sentence or its part) relevant to the query, i.e., containing the exact answer to the question, but also answers synthesized in the form of a new minimum redundant and question oriented NL phrase. The system is oriented, though not strictly, to the retrieval of answers to the questions from a predetermined set of such question types. Classification of questions is based on known data about the most frequent question in the practice of Q-A systems, as well as based on three well-known main types of knowledge about the outside world/subject domain (as a matter of fact, text documents serve as a means of expression of those types of knowledge). These types of knowledge are recognized at the stage of indexing/labeling of text DB and they allow, among everything else, restricting of the semantic context of the answer. The user is provided with mechanisms for the creation and inclusion of new question types that present interest for him/her to the mentioned question set.

The system carries out linguistic analysis of a received question, e.g., from a user, and text documents in a database (DB) and performs semantic labeling of the same in terms of the main types of knowledge and their components. At the same time, the system labels text in terms of question types and components of potential answers (in the case of text documents) for so-called "target lexical units." The system does this using text labeling models that correspond to human behavior. In this case, a matching procedure uses the mentioned types of semantic labels and allows an exact answer to the posted question to be found. If needed, the answer can be synthesized in the form of a new NL phrase on the basis of semantic labels of recognized types of knowledge and their components.

An embodiment of a question-answering system based on automatic semantic labeling, hereinafter referred to as a Q-A System 150 or System 150, in accordance with aspects of the present invention, may be appreciated with reference to the exemplary embodiment of FIG. 1. The Q-A System 150 processes a received user question 70, carries out a search for answers to that question in previously processed text documents that are stored in a Labeled Text Documents Database 50, and provides them to the user in the form of Answer 130. The answer includes the original phrases from text documents and, upon demand, NL phrases synthesized based thereon. In this embodiment, the Q-A System 150 includes a Preformatter 20 (for preformatting the original text documents), a Linguistic Analyzer 30 (for linguistic analysis of the preformatted text), a Text Document Labeler (for building a search index of text documents and creating Labeled Text Documents Database 50), a Linguistic Analyzer 80 (for linguistic analysis of the user Question), a Question Labeler 90 (for building a search index of the question), a Searcher 100 (for conducting a search for the answer to the Question in the Labeled Text Documents Database), an Answer Ranker 110 (for ranking, which can be based on relevance, the retrieved answers to the user Question 70 by the Q-A System 150), and a text Synthesizer 120 (for forming an answer to the user Question 70 in the form of original fragments of text documents, as well as synthesized NL phrases).

The functionality of the modules of the Q-A System 150 may be embodied in computer program code that is executable by at least one processor and is maintained within a Linguistic Knowledge Base 60. The semantic processing functionality could alternatively or additionally be embodied in hardware, firmware, or a combination of the foregoing, which is also true of other functional modules or processors described herein. The Linguistic Knowledge Base 60 can include various databases, such as dictionaries, classifiers, statistical data, etc., and databases for recognizing linguistic models or linguistic patterns used for text-to-words splitting, recognition of noun and verb phrases, subject, object, action and their attributes, cause-effect relation recognition, and so on. The text preformatting performed by Preformatter 20 is preferably performed according to the techniques described in U.S. Pat. No. 7,251,781, in this embodiment. Preferably, preformatting the text includes removing non-natural language symbols, e.g. punctuation, from the text.

Figure 2:
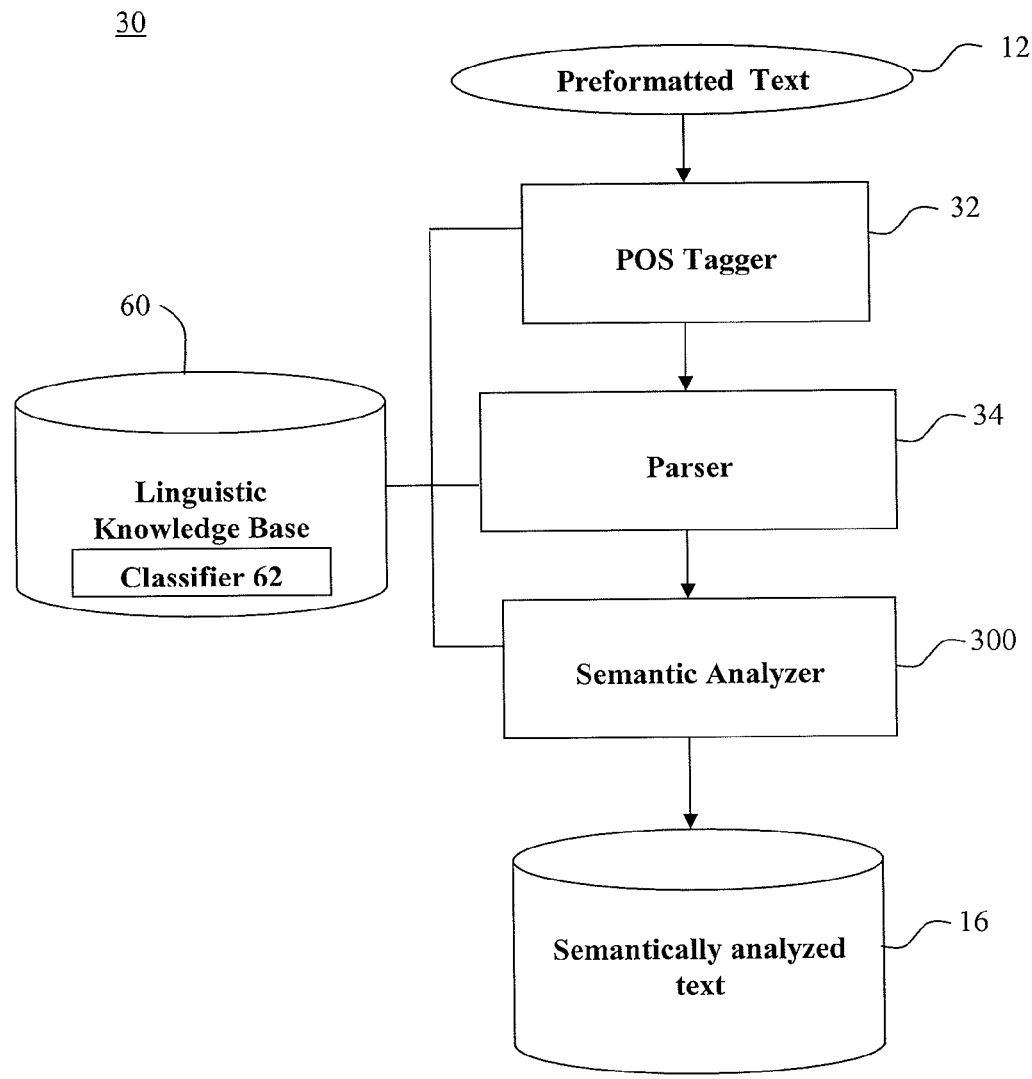
FIG. 2 a high-level architecture diagram of an embodiment of a set of functional modules or processors, which can be implemented in one or more computers, to form a Linguistic Analyzer, according to the aspects of the present invention.

FIG. 2 illustrates an embodiment of modules that can comprise the Linguistic Analyzer 30. The Linguistic Analyzer 30 processes preformatted text from the Preformatter 20 to produce semantically analyzed text 16. The preformatted text 12 is received by a Parts-of-Speech Tagger 32, which determines and applies parts-of-speech tags to the preformatted text 12. The Parser 34 then parses the POS tagged text for processing by the Semantic Analyzer 300. The functions performed by the POS Tagger 32 and the Parser 34 are preferably performed in accordance with the techniques described in U.S. Pat. No. 7,251,781, in this embodiment.

Figure 3:
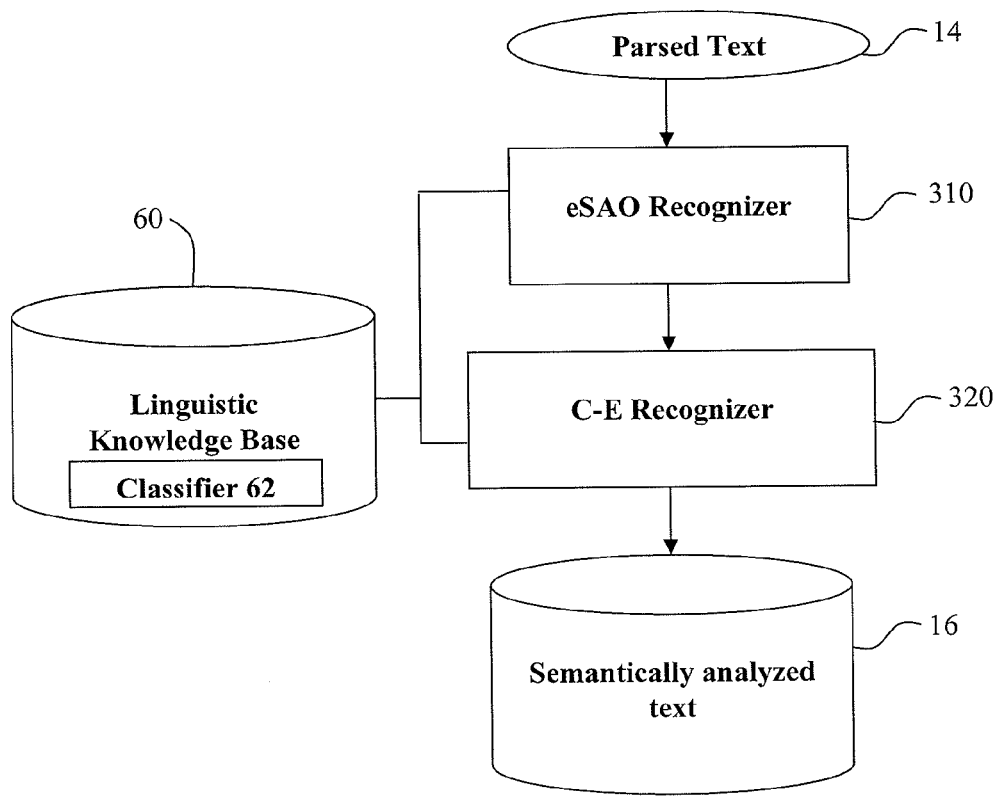
FIG. 3 a high-level architecture diagram of an embodiment of a set of functional modules or processors, which can be implemented in one or more computers, to form a Semantic Analyzer, according to the aspects of the present invention.

FIG. 3 illustrates an embodiment of the modules that can comprise the Semantic Analyzer 300. The Semantic Analyzer 300 receives parsed text 14 and produces the semantically analyzed text 16. The Semantic Analyzer 300 has an eSAO Recognizer 310 that performs expanded Subject-Action-Object (eSAO) semantic relations (or relationship) recognition, and finds eSAOs in the form of eSAO sets, and a C-E Recognizer 320 that performs Cause-Effect semantic relations (or relationship) recognition within and/or between eSAOs. Semantic relations of eSAO type are relations of the Subject (S)-Action(A)-Object(O) type, which include attributes such as Preposition, Indirect Object, Adjective, and Adverbial of these components.

FIG. 4A illustrates example of recognizing semantic relations of eSAO type in text performed by eSAO Recognizer 310 for the sentence:

The maximum value of x is dependent of the ionic radius of the lanthanide element.

Note, that in a general case, Subject, Object and Indirect Object have their inner structure (the component proper and its attributes), which correspond to semantic relations: Parameter, Whole-Part, etc. eSAO relation recognition is preferably performed in accordance with the techniques described in U.S. Pat. No. 7,251,781, in this embodiment.

Determining cause-effect relations according to this embodiment comprises pairing one or more eSAOs (both complete and incomplete) as causes with one or more eSAOs as effects (again complete and incomplete). Note that a single eSAO can spawn both a cause eSAO and en effect eSAO. Also, from the point of view of knowledge engineering and natural language particularities, cause-effect relations can be found in separate eSAOs.

C-E Recognizer 320 uses linguistic patterns from Linguistic Knowledge Base 60 to detect cause-effect relations in text sentences inside a single eSAO and between different eSAOs.

FIG. 4B illustrates the cause-effect relation recognized by C-E Recognizer 320 in two eSAOs in the input sentence, in accordance with one of the linguistic patterns that is presented in the Linguistic Knowledge Base 60:

The register contains the proper bit pattern to begin its shift-out operation.

Cause-effect relation recognition is preferably performed in accordance with the techniques described in U.S. Patent App. Pub. No. 20060041424, in this embodiment.

Semantic labels (Subject|Object|IndirectObject, eSAO, C-E) set by the Linguistic Analyzer 30 in the input text in the semantic analysis stage correspond to three major types of knowledge about outside world/subject domain (i.e., objects, facts, and the rules reflecting regularities of the outside world/ knowledge domain) and together with lexical, grammatical, and syntactic tags cover practically all lexical units of the input text and provide efficient computer-based technology for developing linguistic patterns for further text semantic labeling depending on the purpose, that is for target semantic labeling. The idea of this technology is that Linguistic Analyzer 30 thus gives an expert an ability to "wrap" any particular example of a new tagged semantic relation with the labels for different levels of language analysis: lexical, grammatical, syntactical, and semantic, independent of the language and knowledge domain. A user can specify this new tagged semantic relation by highlighting corresponding words on a computer screen in the text fragment. Thus, the Linguistic Analyzer 30 gives the ability, therefore, to generalize a linguistic pattern for recognizing semantic relations in the text and, on the other hand, and to functionally support the automatic recognition of this relation in any text on the basis of a created pattern, since the Linguistic Analyzer can have access to the level of the text analysis used by the linguistic pattern. This recognition can be performed on Topical Content as well as in Logical Content.

The described method of semantic labeling, as well as the technology of creation of required linguistic patterns, is used by Text Documents Labeler 40 to create an efficient search index of text documents. The Q-A System 150 can be, in advance, supplied with a Classifier 62 of the main types of questions, as target questions, that represent one of the components of Linguistic Knowledge Base 60. Based thereon, and taking into account the fact that the retrieval of the exact answer to the question in general requires linguistic, as well as semantic, analysis of the user query (or question)/text documents and an effective procedure for their matching, the emphasis of the strategy of that procedure is partially shifted to the stage of target semantic labeling of text documents.

During this stage, so-called target words are recognized in texts on the basis of linguistic patterns. Target words are words to which one can pose questions of types from the defined classification. Such words are assigned markers of corresponding question types and markers of certain components of their contexts. Such components present potential answers to these questions. Due to the fact that target words, as well as the words presenting their context, are components of semantic relations of eSAO and Cause-Effect type (and have the corresponding semantic labels), the creation of required linguistic patterns is performed according to the above-mentioned effective approach. At the same time, it is taken into consideration that the target word may answer the direct question about this word, as a component of mentioned semantic relations either without recognizing its sense or recognizing its sense, if it belongs to a certain semantic class. Thereafter, the semantic context of the answer is set very strict. Due to the strictness of eSAO format, all preconditions for correct synthesis of the answer to the question in the form of a NL phrase exist.

Thus, linguistically analyzed text documents proceed to Text Documents Labeler 40, which first of all registers their lexical, grammatical, and syntactic tags, and semantic labels and then performs their target semantic labeling based on the question classification and corresponding linguistic patterns that are set in Linguistic Knowledge Base 60. For example, let one of the sentences of the Text Documents 10, that is processed by the System 150, be:

Da Vinci was 51 years old when he painted Mona Lisa.

After its processing by Preformatter 20 and Linguistic Analyzer 30, the following presentation will be obtained (for simplicity the markers "main/attribute" of the internal structure of subjects and objects are omitted):

| Subject1 | Da_NP Vinci_NP | Subject2 | Da_NP Vinci_NP |
|---|---|---|---|
| Action1 | be_BE | Action2 | paint_VB |
| Object1 | | Object2 | Mona_NP Lisa_NP |
| Preposition1 | | Preposition2 | |
| IndirectObject1 | | IndirectObject2 | |
| Adjective1 | 51_CD years_NNS old_JJ | Adjective2 | |
| Adverbial1 | | Adverbial2 | |

Here NP, BE, CD, NNS, JJ, VB are POS-tags of words; Subject, Action, etc. are semantic labels, the so-called eSAO labels.

Further, Text Documents Labeler 40, on the basis of one of the linguistic patterns from Linguistic Knowledge Base 60, determines, for example, that the sequence of words "Da Vinci" is a target for one of the questions of the "Age" type, i.e., assigns this sequence the semantic label "QT_Age". Below is the formal description of the mentioned linguistic pattern:

| Subject | Exist | QT_Age | ANS_Adj |
|---|---|---|---|
| Action | BE | | |
| Object | — | | |
| Preposition | | | |
| IndirectObject | — | | |
| Adjective | [ABOUT] + NUMBER + MEASURE | | |
| Adverbial | — | | |

Here the lexical unit in the Action field should have POS-tag BE; the Adjective field has "[ABOUT]+NUMBER+MEASURE" sense. In a preferred embodiment, an "ABOUT" sense at least equals the words or phrases "about|approximately|at least|over|only|below|above|more than|less than"; a "NUMBER" is a non-terminal symbol denoting some number with the use of words or digits (in any case it will have a POS-tag of CD); a "MEASURE" is a non-terminal symbol denoting units of measure of time ("day|week|month|year|etc.").

Similarly, Text Documents Labeler 40 will determine that in the sentence "Oxygen also has a similar harmful effect on the grain growth" the word "oxygen" is a target for the question of "disadvantage" type and it will assign this word a semantic label of "QT_Disadvantage". And in the sentence "Mr. Mark Chapman is a killer of John Lennon", for example, the target word "killer" will be assigned the semantic label "QT_SubjectPerson".

It should be noted, that a single target word may have several different semantic labels denoting various types of questions.

Simultaneously with detecting target words and their semantic labels, Text Documents Labeler 40, on the basis of the same linguistic patterns, registers and marks components of the sentences that constitute the answer to that question type. Thus, for example, for the target word "Da Vinci" with the semantic label "QT_Age" from the first sentence, Adjective1 field will be registered as the answer on the basis of the marker "ANS_Adj" from the stated formal representation of the pattern, i.e. "51 years"; for the target word "oxygen" with the semantic label "QT_Disadvantage" from the second sentence, Object field+Preposition field+IndirectObject field will be registered as the answer, i.e. "harmful effect on the grain growth"; for the target word "killer" with the semantic label "QT_SubjectPerson" from the third sentence, Subject field will be registered as the answer, i.e. "Mr. Mark Chapman".

Taking into account the strictness of eSAO format, the mentioned answers represent certain components of eSAO and, thus, may also be synthesized in the form of sentences in NL.

Labeled with the help of the Linguistic Analyzer 30 and Text Documents Labeler 40, text documents proceed to the Labeled Text Documents database 50, for use by other components of System 150 that perform the retrieval of the answers to the input Question 70.

Preliminary, Question 70 undergoes its processing by Linguistic Analyzer 80 that performs linguistic analysis, which is similar to the linguistic analysis performed by Linguistic Analyzer 30 for text documents.

For example, as the result of linguistic analysis of the question "How old was Da Vinci when he painted Mona Lisa?" the following formal representation will be obtained:

| Subject1 | Da_NP Vinci_NP | Subject2 | Da_NP Vinci_NP |
|---|---|---|---|
| Action1 | be_BE | Action2 | paint_VB |
| Object1 | | Object2 | Mona_NP Lisa_NP |
| Preposition1 | | Preposition2 | |
| IndirectObject1 | | IndirectObject2 | |
| Adjective1 | old_JJ | Adjective2 | |
| Adverbial1 | | Adverbial2 | |

Further at this stage the word "how" from the question will obtain the marker "QWord" and the word "old"—the marker "QHowClassifier". This will be performed on the basis of the linguistic patterns from the Linguistic Knowledge Base 60.

The obtained formal representation further proceeds to Question Labeler 90 that, on the basis of linguistic patterns, determines the target word of the question, as well as the type of the question according to the defined classification, and assigns the corresponding semantic marker to the target word of the question. Below is an example of one of the linguistic patterns that will be further used in processing the above-mentioned question (components of eSAO, which are not critical for the pattern, are omitted from the description):

| Subject | Exist | QT_Age | NG |
|---|---|---|---|
| Action | BE | | |
| Qword | how | | |
| QHowClassifier | old | | |

Based on this pattern and taking into account the above-mentioned results of the linguistic analysis of the question, Question Labeler 90 will produce the following final formal representation of the discussed question "How old was Da Vinci when he painted Mona Lisa?":

| 1 | Da | NGAttr | |
|---|---|---|---|
| 1 | Vinci | NGMain | QT_Age |
| 2 | Da | SubjAttr | |
| 2 | Vinci | SubjMain | |
| 2 | paint | Act | |
| 2 | Mona | ObjAttr | |
| 2 | Lisa | ObjMain | |

According to this formal representation Searcher 100 should search in the Labeled Text Documents Database 50 those sentences of text documents that include the semantic marker QT_Age. In addition, such marker can be assigned to any noun group (NG), disregarding what eSAO marker it has: Subject, Object or IndirectObject. Moreover, such sentences should contain one more eSAO in which the fields Subject, Action and Object will have the following corresponding values: "Da Vinci", "paint", "Mona Lisa". In this case, this eSAO determines the semantic context of the answer. FIGS. 5A and 5B illustrate the results of linguistic analysis and semantic labeling on the basis of corresponding linguistic patterns of two more questions: "What are the disadvantages of oxygen?" and "Who killed John Lennon?". In order to stay compact, only non-empty eSAO fields are listed there.

In the latter case, the formal description of the question consists of the group of three representations obtained as the result of the use of linguistic means of rephrasing (REPH). This is indicated by the marker REPH in the corresponding field of the linguistic pattern, see FIG. 5B.

In any case, the formal representation of the question obtained by Question Labeler 90 is in fact the disjunctive normal form. Conjunctions of that form represent certain lexical units of the question with the corresponding semantic markers. Thus, the first and the second representations, given as examples, include one conjunct, whereas the last one—three conjuncts. At that, a single target word is selected in each of the conjuncts. In addition to eSAO marker, such word is assigned a semantic marker denoting the question type, for example, QT_Age, QT_Disadvantage, QT_SubjectPerson, etc.

The semantically labeled question proceeds further to the Searcher 100 that performs an automatic search of the answer to the input question. The search is conducted in the Labeled Text Documents Database 50, based on the obtained formal representation of the question.

As a result, Searcher 100 registers as relevant those sentences from the semantically labeled text documents that fully or partially satisfy at least one of the conjuncts of the formal representation of the question according to the following criteria:

1. all of the words of the conjunct, including the target word and the words defining the context of the answer, are present in the semantically labeled sentence; and
2. semantic labels of the same words and their sets, also including markers of the question type, match in the question conjunct and in the sentence.

Sentences, selected according to these criteria, proceed further to the Answer Ranker 110 that performs their ranking according to the degree of their relevance to the above-mentioned criteria. At that, the user can independently set which specific criteria should be given priority, e.g., through interaction with the Answer Ranker via a computer display. In any case the most relevant are those sentences that completely correspond to the formulated criteria.

Sentences relevant to the question proceed further to the Text Synthesizer 120 that forms the Answer 130 itself—in the form of a phrase from the sentence or a new NL phrase. This is done on the basis of markers set in the sentence by the Text Documents Labeler 40, i.e., markers that determine the components of the answer to the question. Presentation of the answer in the form of a new NL phrase is achieved due to the strictness of the format of the formal representation of the question (eSAO format) and the corresponding linguistic patterns from the Linguistic Knowledge Base 60. For example, for the first of the mentioned questions the answer of that type will be "Da Vinci was 51 years old" and for the second— "Disadvantage of oxygen is harmful effect on the grain growth".

Thus, the following three most relevant sentences may be chosen by the System 150 based on the disclosed method as the answers for questions given in the example above:

1. Da Vinci was 51 years old when he painted Mona Lisa.
2. Oxygen also has a similar harmful effect on the grain growth.
3. Mr. Mark Chapman is a killer of John Lennon.

Correspondingly, the System will give the following short answers, respectively:

1. 51 years
2. harmful effect on grain growth
3. Mark Chapman

As it has been already mentioned, the functionality of the Text Documents Labeler 40 and Question Labeler 90 is ensured by the Classifier 62 of the question types and a number of corresponding linguistic patterns from the Linguistic Knowledge Base 60. Analyzing his/her information necessity and linguistic means of its expression in text documents, a user has a possibility of formulating new types of questions, adding them to the Classifier 62 and also developing corresponding linguistic patterns using efficient technology of their creation.

In a preferred embodiment, Linguistic Knowledge Base 60 embodies different types of questions and corresponding linguistic patterns including, but not limited to, those examples shown below, where outlined are markers of question types; specific examples for each of question type; examples of the sentences from the text documents that are chosen by the System 150 based on the disclosed method as the most relevant, as well as the answers to the questions in the form of the original fragments of these sentences (for brevity, all the corresponding formal descriptions are omitted); and target words of questions and sentences are underlined):

QT_Metric

| | |
|---|---|
| Text | The pressure of the air-fuel mixture in the combustion chamber is 15.616 atmospheres. |
| Query | What is the pressure of air fuel mixture in the chamber? |
| Answers | 15.616 atmospheres |

QT_Amount

| | |
|---|---|
| Text | The United States sent 150 000 soldiers to Iraq. |
| Query | How many soldiers were sent to Iraq? |
| Answers | 150 000 soldiers |

QT_Speed

| | |
|---|---|
| Text | The data is calculated at a speed of two billion operations per minute. |
| Query | How fast is the data calculated? |
| Answers | two billion operations per minute |

QT_Parameter

| | |
|---|---|
| Text | The melting temperature of copper is 1034 degrees Celsius. The specific gravity of copper is 8.96. |
| Query | What are the parameters of copper? |
| Answers | melting temperature is 1034 degrees Celsius; specific gravity is 8.96 |

QT_Distance

| | |
|---|---|
| Text | The bullet can fly about 10 kilometers. |
| Query | How far can a bullet fly? |
| Answers | 10 kilometers |

QT_Height

| | |
|---|---|
| Text | The Eiffel Tower is 300 meters in height but measures an additional 24 meters with the inclusion of its aerial. |
| Query | How high is the Eiffel Tower? |
| Answers | 300 meters |

QT_Depth

| | |
|---|---|
| Text | The standard pressurizing chamber is 3.26 feet in depth. |
| Query | What is the depth of pressurizing chamber? |
| Answers | 3.26 feet |

QT_Length

| | |
|---|---|
| Text | The length of the bar is one inch. |
| Query | What is the length of the bar? |
| Answers | one inch |

QT_Mass

| | |
|---|---|
| Text | The Sun weights $4 \times 10^{33}$ grams so this loss equals 0.008 percent of its current mass. |
| Query | What is the mass of Sun? |
| Answers | $4 \times 10^{33}$ grams |

QT_Remoteness

| | |
|---|---|
| Text | The distance between Minsk and Boston is 7151 kilometers. |
| Query | How far is Minsk from Boston? |
| Answers | 7151 kilometers |

QT_RemotenessInner

| | |
|---|---|
| Text | The distance between electrodes on a printed circuit is 5 mm. |
| Query | What is the distance between electrodes? |
| Answers | 5 mm |

QT_Age

| | |
|---|---|
| Text | Da Vinci was 43 years old when he painted Mona Lisa. |
| Query | What was the age of Da Vinci when he painted Mona Lisa? |
| Answers | 43 years |

QT_Size

| | |
|---|---|
| Text | The diameter of the Earth is 7926 miles at equator. |
| Query | How big is the Earth? |
| Answers | diameter is 7926 miles |

QT_Thickness

| | |
|---|---|
| Text | The ball pen, invented by Laszlo Biro in 1938, has a thickness of 3.0-3.5 mm. |
| Query | How thick is the pen invented by Laszlo Biro? |
| Answers | 3.0-3.5 mm |

QT_Width

| | |
|---|---|
| Text | The width of the bar is 21.31 meters. |
| Query | How wide is the bar? |
| Answers | 21.31 meters |

QT_Temperature

| | |
|---|---|
| Text | The surface temperature of the Sun is approximately 9900° F. |
| Query | How hot is the Sun? |
| Answers | 9900° F. |

QT_Time

| | |
|---|---|
| Text | The World War II took place in 1939-1946. |
| Query | When did the World War II happen? |
| Answers | in 1939-1946 |

QT_Frequency

| | |
|---|---|
| Text | The propeller rotates at 15 Hz. |
| Query | What is a rotation frequency of a propeller? |
| Answers | 15 Hz |

QT_Color

| | |
|---|---|
| Text | The octopus blood is blue, since it contains copper oxide. |
| Query | What is the color of octopus's blood? |
| Answers | blue |

QT_Duration

| | |
|---|---|
| Text | The water was heated for two hours. |
| Query | What was the duration of water heating? |
| Answers | two hours |

QT_Number

| | |
|---|---|
| Text | For example the power connector to the motherboard has 20 pins. |
| Query | How many pins does the power connector have? |
| Answers | 20 pins |

QT_NumberedAction

| | |
|---|---|
| Text | In 2005, for example the EU spent 1.43 billion Euro on export subsidies to dump surplus. |
| Query | How much does EU spend on export subsidies? |
| Answers | 1.43 billion Euro |

QT_Shape

| | |
|---|---|
| Text | The rectangular side bar is rotated by the engine. |
| Query | What is the shape of side bar rotated by the engine? |
| Answers | rectangular |

QT_Condition

| | |
|---|---|
| Text | The Na3N changes to a crystalline faun at room temperature. |
| Query | At what condition does the Na3N change to a crystalline form? |
| Answers | room temperature |

QT_Material

| | |
|---|---|
| Text | The car body is made of zinked aluminum. |
| Query | What is the car body made of? |
| Answers | zinked aluminum |

QT_Difference

| | |
|---|---|
| Text | Calculator is much smaller than a computer, but computer is more powerful than a calculator. |
| Query | How does a computer differ from calculator? |
| Answers | calculator is smaller; computer is more powerful |

-continued

QT_Similarity

| | |
|---|---|
| Text | Apples have a taste similar to plums. Apples have the same shape as plums. |
| Query | How is apple similar to plum? |
| Answers | similar taste; same shape |

QT_Prevention

| | |
|---|---|
| Text | The antirust liquid is applied to the surface to avoid corrosion of metal |
| Query | How to preclude corrosion of metal? |
| Answers | antirust liquid applied to surface |

QT_Application

| | |
|---|---|
| Text | Aspirin may be used to preclude headache and prevent migraine. |
| Query | What are the applications of aspirin? |
| Answers | preclusion of headache; prevention of migraine |

QT_Definition

| | |
|---|---|
| Text | A laser is a device that emits light through stimulated emission. |
| Query | What is a laser? |
| Answers | device emitting light through stimulated emission |

QT_DefinitionPerson

| | |
|---|---|
| Text | Bill Gates, a chairman of Microsoft Corp., was born on Oct. 28, 1955. |
| Query | Who is a chairman of Microsoft? |
| Answers | Bill Gates |

QT_Advantage

| | |
|---|---|
| Text | Microsoft Excel efficiently manages your data. |
| Query | What are the advantages of Excel? |
| Answers | efficient management of data |

QT_Disadvantage

| | |
|---|---|
| Text | Aspirin may damage stomach and injure the bowels. |
| Query | What are the disadvantages of aspirin? |
| Answers | damage of stomach; injury of bowels |

QT_IndirectObject

| | |
|---|---|
| Text | The personal computer is linked to the server through network. |
| Query | To what is the personal computer connected? |
| Answers | to server |

QT_IndirectObjectPerson

| | |
|---|---|
| Text | Bill Gates is married to Melinda French. |
| Query | To whom is Bill Gates married? |
| Answers | to Melinda French |

QT_ObjectPerson

| | |
|---|---|
| Text | Dmitry Medvedev replaced Vladimir Putin as the president of Russia. |
| Query | Whom did Dmitry Medvedev replace as the president of Russia? |
| Answers | Vladimir Putin |

QT_SubjectPerson

| | |
|---|---|
| Text | Alexandre Gustave Eiffel built the Eiffel Tower on 1889. |
| Query | Who built the Eiffel Tower? |
| Answers | Alexandre Gustave Eiffel |

QT_Cause

| | |
|---|---|
| Text | The sky is blue because the air scatters blue light from the sun. |
| Query | Why is the sky blue? |
| Answers | air scattering blue light from the sun |

QT_Effect

| | |
|---|---|
| Text | The application of antirust means prevents from corrosion. |
| Query | What is the effect of application of antirust? |
| Answers | no corrosion |

-continued

QT_Hyponym

| | |
|---|---|
| Text | The birds, such as canary or goose, usually nest in the hollows. |
| Query | What birds can nest in the hollows? |
| Answers | goose; canary |

QT_Location

| | |
|---|---|
| Text | Tretyakov has founded the gallery located in Moscow. |
| Query | Where is gallery, founded by Tretiakov? |
| Answers | in Moscow |

QT_Object

| | |
|---|---|
| Text | The Library of Congress stores millions of books, recordings, photographs, maps and manuscripts in its collection. |
| Query | What does the Library of Congress store? |
| Answers | books, recordings, photographs, maps and manuscripts |

QT_Interaction

| | |
|---|---|
| Text | The refrigerating fluid cooled by the compressor is circulated by the pump. |
| Query | How do refrigerating fluid and pump interact? |
| Answers | pump circulates refrigerating fluid |

QT_Function

| | |
|---|---|
| Text | The water heated by the boiler is circulated by the pump. |
| Query | What are the functions of the boiler? |
| Answers | heating of water |

QT_Subject

| | |
|---|---|
| Text | In vehicle dynamic shock absorbers are used to optimize driving comfort. |
| Query | What can optimize driving comfort? |
| Answers | dynamic shock absorbers |

QT_Method

| | |
|---|---|
| Text | Roller bearings are lubricated to reduce friction on moving components. |
| Query | What method can be used to reduce friction? |
| Answers | lubricating of roller bearings |

QT_StructurePart

| | |
|---|---|
| Text | The computer consists of a system unit, a keyboard, a mouse and a monitor. |
| Query | What are the parts of computer? |
| Answers | system unit; keyboard; mouse; monitor |

QT_StructureWhole

| | |
|---|---|
| Text | The serial bus is a part of a motherboard. |
| Query | What includes serial bus? |
| Answers | motherboard |

QT_Type

| | |
|---|---|
| Text | The fast water evaporation turbine is rotated by the steam engine. |
| Query | What evaporation turbines are rotated by the engine? |
| Answers | fast water evaporation turbine |

Embodiments in accordance with aspects of the present invention can be provided by computer-executable instructions executable by one or more computers, microprocessors, microcontrollers, or other processing devices. The computer-executable instructions for executing the system and method can be resident in memory accessible by the processing devices or may be provided to the processing devices by floppy disks, hard disks, compact disk (CDs), digital versatile disks (DVDs), read only memory (ROM), or any other storage medium.

Figure 6:
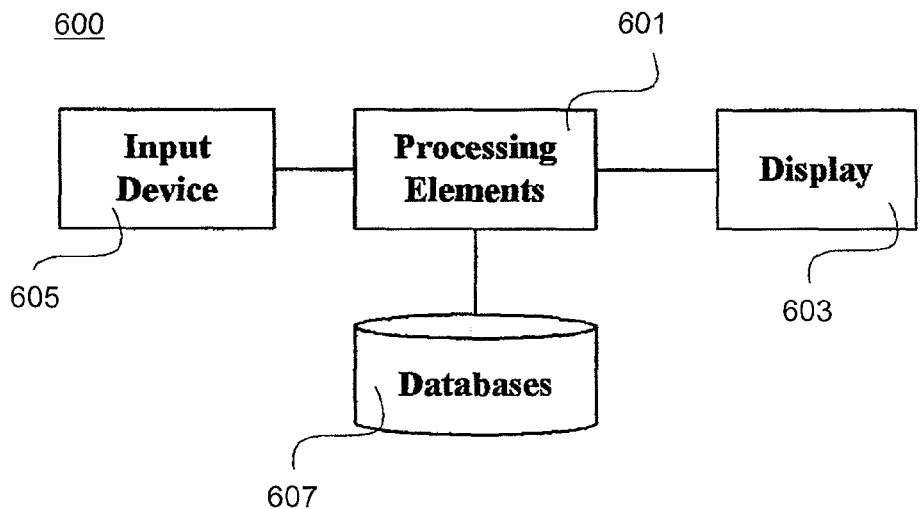
FIG. 6 shows an architecture diagram for an embodiment of a computer implementation that, when properly configured, can be used to perform one or more functions or methods described herein, according to aspects the present invention.

For example, embodiments in accordance with aspects of the present invention may be implemented in specially configured computer systems, such as the computer system 600 shown in FIG. 6. The computer system 600 may include at least one processing element 601, a display 603, an input device 605, and a link to databases 607 (or other computer-readable storage media) that provide the necessary information to accomplish the described semantic labeling.

In various embodiments, applications, functional modules, and/or processors described herein can include hardware, software, firmware, or some combination thereof. To the extent that functions are wholly or partly embodied in program code, those functions are executed by one or more processors that, taken together, are adapted to perform the particular functions of the inventive concepts, as one or more particular machines. And, to the extent software or computer program code or instructions (sometimes referred to as an "application") are used in various embodiments, it may be stored on or in any of a variety of non-transitory storage devices or media, and executed by one or more processors, microprocessors, microcontrollers, or other processing devices to achieve explicit, implicit, and or inherent functions of the systems and methods described herein. For example, the computer program code may be resident in memory in the processing devices or may be provided to the processing devices by floppy disks, hard disks, compact disk (CDs), digital versatile disks (DVDs), read only memory (ROM), or any other non-transitory storage medium. Such storage devices or media, and such processors, can be collocated or remote to each other, whether logically or physically. For instance, a system in accordance with the inventive concepts may access one or more other computers, database systems, etc. over a network, such as one or more of the Internet (and World Wide Web), intranets, extranets, virtual private networks, or other networks.

Figure 7:
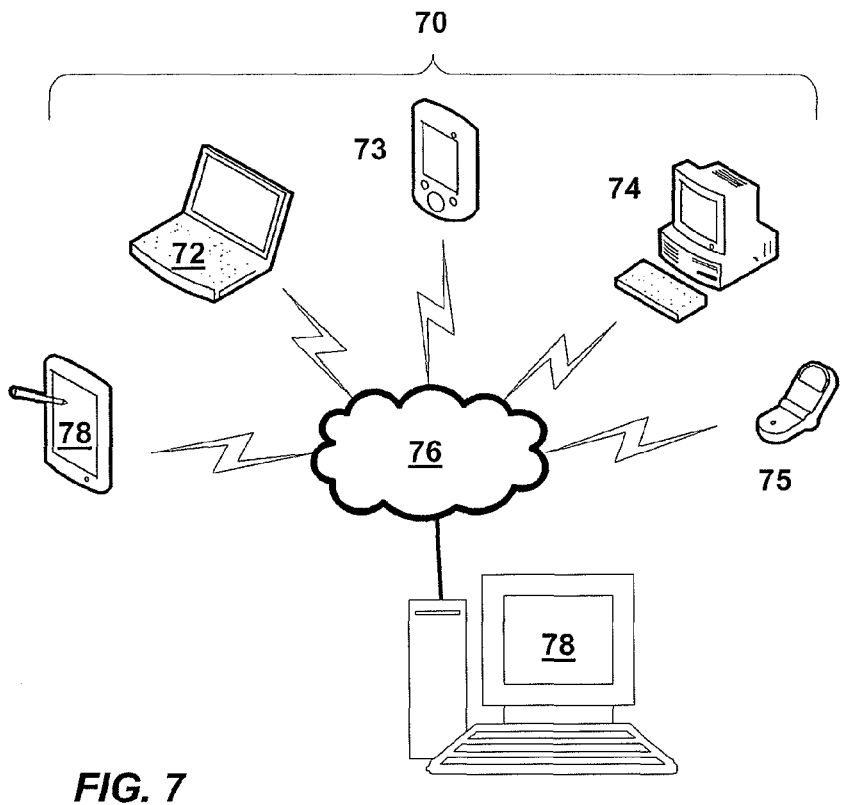
FIG. 7 is an embodiment of a network of computing devices, within which the present invention may be implemented.

As used herein, unless otherwise indicated, a computer can take the form of any known, or hereafter developed, device that includes at least one processor and storage media. For example, referring to FIG. 7, a computer or computer system can include a server 78, personal digital assistant (PDA) 71, laptop computer 72, portable music device 73, personal computer 74, cell phone 75, workstation (not shown), mainframe (not shown), or the like, or some combination thereof. Such devices may include one or more input devices, which may include a keypad or keyboard, microphone, video camera, touch-screen, and the like, as examples. Such devices may also include one or more output devices, which may include a video screen (e.g., computer, cell phone, or PDA screen), touch-screen, image projection system, speaker, printer, and the like, as examples. In some embodiments, a data port may also be considered an input device, output device, or both. In some embodiments, a variety of user devices 90 may interact with a knowledge search and mapping system 10 hosted on computer 78, which can be accessible via the Internet, as an example.

To the extent any elements described herein are remote to each other, they may communicate and/or exchange information over any of a variety of known, or hereafter developed, networks 76, e.g., local area networks, wide area networks, virtual private networks, intranets, computer-based social networks, cable networks, cellular networks, the Internet, the World Wide Web, or some combination thereof.

The foregoing Detailed Description of exemplary and preferred embodiments is presented for purposes of illustration. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art, having understood the disclosure herein. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

This disclosure has been made with respect to the current state of the art, but also contemplates advancements and that adaptations in the future may take into consideration those advancements, namely in accordance with the then current state of the art. It is intended that the scope of the invention be defined by the Claims as written and equivalents as applicable. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

It is, therefore, understood that various modifications may be made and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A method for question-answering based on automatic semantic labeling of text documents and user questions, the method comprising:

electronically receiving natural language text documents using at least one computer processor coupled to at least one non-transitory storage medium;

electronically receiving a user question formulated in a natural language;

performing a basic linguistic analysis of the text documents and the user question;

performing semantic labeling of the text documents through semantic analysis, including identifying target words in the text documents using linguistic patterns stored in a database and assigning question types to the target words in the text documents;

storing the semantically labeled text documents in a labeled text documents database;

performing semantic labeling of the user question through semantic analysis, including identifying one or more target words in the user question using linguistic patterns stored in a database and assigning a question type to each of the one or more target words in the user question;

searching the labeled text documents database for text fragments relevant to the semantically labeled user question at least in part by matching a question type assigned to a target word in the labeled text documents to a question type assigned to a target word in the user question, wherein relevance is based on a ranking of the text fragments relative to the semantically labeled user question; and synthesizing answers to the user question from the relevant text fragments, and electronically presenting the synthesized answer to the user.

2. The method according to claim 1, further comprising:

applying parts-of-speech tags to the text documents and user question to generate tagged text documents and user question;

parsing the tagged text documents and user question to generate parsed and tagged text documents and user question; and semantically analyzing the parsed and tagged text documents and user question to generate semantically analyzed, parsed, and tagged text documents and user question.

3. The method according to claim 2, wherein applying parts-of-speech tags is performed on preformatted text documents that comprise text with non-natural language symbols removed.

4. The method according to claim 2, wherein the semantic analysis comprises:

recognizing one or more facts in the form of one or more expanded Subject-Action-Object (eSAO) sets in the text documents and user question, wherein each eSAO set has one or more eSAO components; and recognizing rules in the text documents and user question that reflect regularities of the outside world/knowledge domain in the form of Cause-Effect relations in the eSAO sets, wherein each of the Cause-Effect relations comprises a Cause eSAO and an Effect eSAO.

5. The method according to claim 4, wherein the one or more eSAO components comprises one or more elements of a group consisting of: subjects, objects, actions, adjectives, prepositions, indirect objects and adverbs.

6. The method according to claim 4, wherein the Cause eSAO comprises one or more eSAO components of the one or more eSAO sets and the Effect eSAO comprises one or more other eSAO components of the one or more eSAO sets.

7. The method according to claim 6, wherein the Cause-Effect relations comprise a sequential operator relating the eSAO components of the Cause eSAO to the other eSAO components of the Effect eSAO with lexical, grammatical, and/or semantic language means.

8. The method according to claim 4, wherein recognizing one or more expanded Subject-Action-Object (eSAO) sets in the text documents and user question comprises recognizing one or more subjects, objects, actions, adjectives, prepositions, indirect objects, and adverbs in one or more sentences of the text documents and user question.

9. The method according to claim 4, wherein recognizing one or more expanded Subject-Action-Object (eSAO) sets and Cause-Effect relations in the text documents and user question comprises accessing a linguistic knowledge base having a database of patterns defining eSAO and Cause-Effect components.

10. The method according to claim 2, wherein identifying target words in the text documents using linguistic patterns stored in the database and assigning question types to the target words in the text documents comprises matching the semantically analyzed, parsed, and tagged text documents against question classification based linguistic patterns in a patterns database that is a part of a linguistic knowledge base using, at least in part, the following steps:

determining part-of-speech tags, syntactic tags, and semantic labels and eSAO sets and Cause-Effect sets for text in the text documents;

generating eSAO labels and Cause-Effect labels; and matching the eSAO labels and Cause-Effect labels to semantic labels of question types and answer components for target words.

11. The method according to claim 2, wherein identifying one or more target words in the user question using linguistic patterns stored in the database and assigning a question type to each of the one or more target words in the user question comprises matching the semantically analyzed parsed, and tagged user question against question classification based linguistic patterns in a patterns database that is a part of a linguistic knowledge base using, at least in part, the following steps:

determining part of-speech tags, syntactic tags, and semantic labels of words in the user question and determining eSAO sets and cause-effect sets from the words of the user question;

generating eSAO labels and cause-effect labels from the eSAO sets and cause-effect sets; and matching the eSAO labels and cause-effect labels to semantic labels of question types for target words.

12. The method according to claim 1, wherein searching the labeled text documents database for the text fragments relevant to semantically labeled user questions is based on matching the semantically labeled user questions against sentences from the labeled text documents database, comprising:

matching words and semantic labels; and building a list of sentences relevant to the user question with indication of a degree of relevance.

13. The method according to claim 1, further including ranking sentences from the labeled text documents database relevant to the user question based on a degree of relevance of each sentence to a user question, determined according to predetermined criteria for matching semantic information from each sentence with semantic information from the user question.

14. The method according to claim 1, wherein synthesizing the answers includes:

synthesizing natural language answers to a user question from relevant sentences is performed in the form of those original fragments of relevant sentences which were marked with labels of answer components on the stage of semantic labeling of text documents, and in the form of new natural language phrases, generated on the basis of linguistic patterns from the linguistic knowledge base, based on the an eSAO format.

15. A computer program product comprising a non-transitory computer-readable medium having stored therein computer-executable instructions for performing a method for question-answering based on automatic semantic labeling of text documents and user questions, the method comprising:

electronically receiving natural language text documents;

electronically receiving a user question formulated in a natural language;

performing a basic linguistic analysis of the text documents and the user question;

performing semantic labeling of the text documents through semantic analysis, including identifying target words in the text documents using linguistic templates and assigning question types to the target words, storing the semantically labeled text documents in a labeled text documents database;

performing semantic labeling of the user question through semantic analysis, including identifying one or more target words in the user question using linguistic templates and assigning question types to the one or more target words;

searching the labeled text documents database for text fragments relevant to the semantically labeled user question, wherein relevance is based on a ranking of the text fragments relative to the semantically labeled user question; and synthesizing answers to the user question from the relevant text fragments.

16. The computer program product of claim 15, wherein the method further comprises electronically presenting to the user the answers to his or her questions.

17. A question-answering system that uses automatic semantic labeling of text documents and user questions in electronic or digital form formulated in natural language, the system comprising:
- one or more processors;
- a linguistic knowledge base that includes a plurality of question-classification based linguistic patterns; and
- a linguistic analyzer configured to produce linguistically analyzed text documents and user questions using the one or more processors, the linguistic analyzer comprising a semantic analyzer that includes:
    - an expanded Subject-Action-Object (eSAO) recognizer and a Cause-Effect recognizer configured to produce semantically analyzed text documents and user questions, including recognizing one or more facts in the form of one or more eSAO sets based on the text documents and on the user questions,
    - wherein eSAO and Cause-Effect recognition is based on patterns stored in the linguistic knowledge base.

18. The question-answering system according to claim 17, wherein the linguistic analyzer further comprises:
- a part-of-speech tagger that receives preformatted text documents based on the text documents and the user questions in electronic or digital format; and
- a parser that receives the text documents and the user questions tagged by the part-of-speech tagger and provides parsed text documents and user question to the semantic analyzer,
    - wherein the part-of-speech tagger and the parser operate with data stored in the linguistic knowledge base.

19. The question-answering system of claim 18, wherein the linguistic analyzer further comprises:
- a preformatter that receives the text documents in electronic or digital format and produces the preformatted text documents;
- a text documents labeler that matches the semantically analyzed text documents against the question classification based linguistic patterns stored in the linguistic knowledge base and generates semantic relationship labels based on the semantically analyzed text documents and the matching, whereby the semantically labeled text documents are stored in labeled text documents database;
- a question labeler that matches the semantically analyzed user question against the question classification based linguistic patterns stored in the linguistic knowledge base and generates semantic relationship labels based on the semantically analyzed user questions and the matching;
- a searcher that matches the semantically labeled user question against sentences from the labeled text documents database, wherein the searcher matches words and semantic labels and builds a list of sentences relevant to the user question with an indication of a degree of relevance;
- an answer ranker that sorts sentences from the labeled text documents database that are relevant to the user question, the sorting in accordance with the degree of relevance of each sentence to the user question; and
- a text synthesizer that generates the natural language answers to the user question from the relevant sentences and electronically presents them to the user.

20. The question-answering system according to claim 19, wherein the preformatter is configured to perform at least one of the following functions:
- removal of any symbols in a digital or electronic presentation of the text documents that do not form part of natural language text;
- detection and correction of any mismatches or mistakes in text documents; and
- partitioning the text into structures of sentences and words.

21. The question-answering system according to claim 19, wherein the text documents labeler is configured to match the semantically analyzed text documents against linguistic patterns by matching words, part-of-speech tags, syntactic tags, eSAO and Cause-Effect sets.

22. The question-answering system according to claim 19, wherein the text documents labeler is configured to generate semantic relationship labels by generating eSAO and Cause-Effect labels and based on matching semantic labels of question types and answer components for target words.

23. The question-answering system according to claim 19, wherein the question labeler is configured to match the semantically analyzed user questions against linguistic patterns by matching words, part-of-speech tags, syntactic tags, labels of question words, eSAO and Cause-Effect sets.

24. The question-answering system according to claim 19, wherein the question labeler is configured to generate the semantic relationship labels by generating eSAO and Cause-Effect labels and based on matching semantic labels of question types for target words.

25. The question-answering system according to claim 19, wherein the text synthesizer is configured to generate natural language answers to the user questions by generating answers in the form of original fragments of relevant sentences, and in the form of new natural language phrases, generated on the basis of linguistic patterns from the linguistic knowledge base based on eSAO format.

26. The question-answering system according to claim 17, wherein the semantic analyzer is also configured to generate Cause-Effect relations from the eSAO sets, wherein each of the Cause-Effect relations comprises a Cause eSAO, an Effect eSAO, and at least one sequential operator relating the Cause eSAO to the Effect eSAO.

27. The question-answering system according to claim 26, wherein each of the eSAO sets comprises eSAO components and the Cause eSAO comprises one or more of the eSAO components and the Effect eSAO comprises one or more of the eSAO components different than the one or more eSAO components of the Cause eSAO.

28. The question-answering system according to claim 27, wherein the one or more eSAO components comprises one or more elements of a group consisting of: subjects, objects, actions, adjectives, prepositions, indirect objects and adverbs.

\* \* \* \* \*